(12) United States Patent
Lin

(10) Patent No.: US 8,667,861 B2
(45) Date of Patent: Mar. 11, 2014

(54) SHIFTER

(76) Inventor: Chang Hui Lin, Changhu (TW)

( * ) Notice: Subject to any disclaimer, the term of this patent is extended or adjusted under 35 U.S.C. 154(b) by 510 days.

(21) Appl. No.: 13/094,703

(22) Filed: Apr. 26, 2011

(65) Prior Publication Data

US 2012/0272772 A1 Nov. 1, 2012

(51) Int. Cl.
*B62M 25/04* (2006.01)

(52) U.S. Cl.
USPC .................................. 74/502.2; 74/489

(58) Field of Classification Search
USPC .................. 74/473.14, 489, 501.6, 502.2
IPC .................. B62K 23/06; B62M 25/04
See application file for complete search history.

(56) References Cited

U.S. PATENT DOCUMENTS

| | | | | |
|---|---|---|---|---|
| 7,152,497 | B2 * | 12/2006 | Sato et al. | 74/502.2 |
| 7,665,384 | B2 * | 2/2010 | Sato et al. | 74/502.2 |
| 2008/0295638 | A1 * | 12/2008 | Miki et al. | 74/502.2 |

* cited by examiner

*Primary Examiner* — Thomas Diaz

(57) ABSTRACT

A shifter is fixed on a handle of a bicycle and connected with a rear speed changer of a cable and contains: a body, a first bar, and a speed changing mechanism, the body including the first bar, a chamber to receive the speed changing mechanism, and two tabs, and each tab including a first hole, and the body including a first aperture arranged on a top end thereof and communicating with the chamber to insert the cable into the chamber via the first aperture so as to connect with a first seat, the body including a first retaining ring, the chamber including a first positioning pillar, an axial shaft, a second aperture, and a first returning spring, the first positioning pillar being provided to fix a first fixing piece in the chamber, and the axial shaft being used to axially position a first hook in the chamber.

8 Claims, 10 Drawing Sheets

US 8,667,861 B2

SHIFTER

BACKGROUND OF THE INVENTION

1. Field of the Invention

The present invention relates to a speed adjusting device, and more particularly to a speed adjusting device of a speed changer being used in a middle speed changer and a rear speed changer of a bicycle.

2. Description of the Prior Art

A conventional ratchet speed changing mechanism contains a cable to change speed and an actuating lever, wherein the actuating lever is moved to actuate the ratchet speed changing mechanism to shift up and down. In operation, the ratchet speed changing mechanism is actuated by the actuating lever to shift a freewheel upward in one level. If desiring to shift the speed in multi-section level, the actuating lever is moved continuously without being moved in one level at one time.

The present invention has arisen to mitigate and/or obviate the afore-described disadvantages.

SUMMARY OF THE INVENTION

The primary object of the present invention is to provide a shifter which is capable of overcoming the shortcomings of the conventional shifter.

Further object of the present invention is to provide a shifter that is capable of shifting up, shifting down, and shifting down in only one level at one time.

Another object of the present invention is to provide a shifter that if shifting up overly, the third lever is actuated to move backward in one level so that the speed changing mechanism rolls to release the cable, thus shifting down in one to three levels.

To obtain the above objectives, a speed adjusting device of a speed changer provided by the present invention contains:

a base including a first hole fixed on a central portion thereof to insert a first central spindle, and including a holder and a fitting member both of which extend from a front end of the base to connect with an adjusting loop, and the fitting member includes a ring member fitted thereon;

an adjusting loop including a plurality of first screw bores to lock a front cover and a second hole disposed on a central position thereof to receive the first ratchet, the first actuating lever, the ring member, and the, the second hole including a groove fixed at a suitable position of an outer side thereof;

a front cover including a first orifice formed on a central portion thereof to insert a first screw so that the returning spring is hooked with the first screw and is fixed in the rear speed changer such that the front cover, the adjusting loop, the holder are pressed on the rear speed changer.

DETAILED DESCRIPTION OF THE PREFERRED EMBODIMENTS

Figure 1:
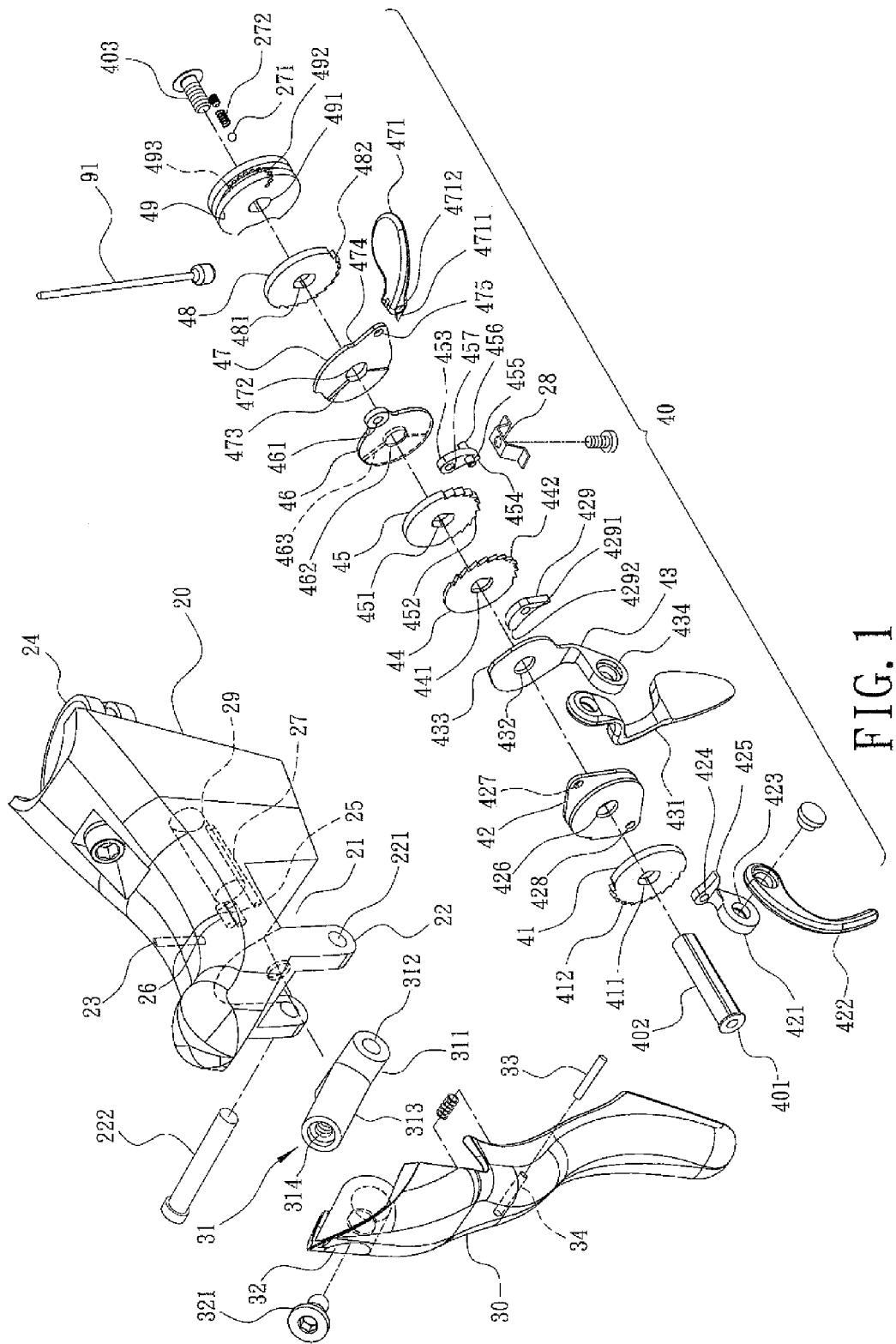
FIG. 1 is a perspective view showing the exploded components of a shifter according to a first embodiment of the present invention.
Figure 2:
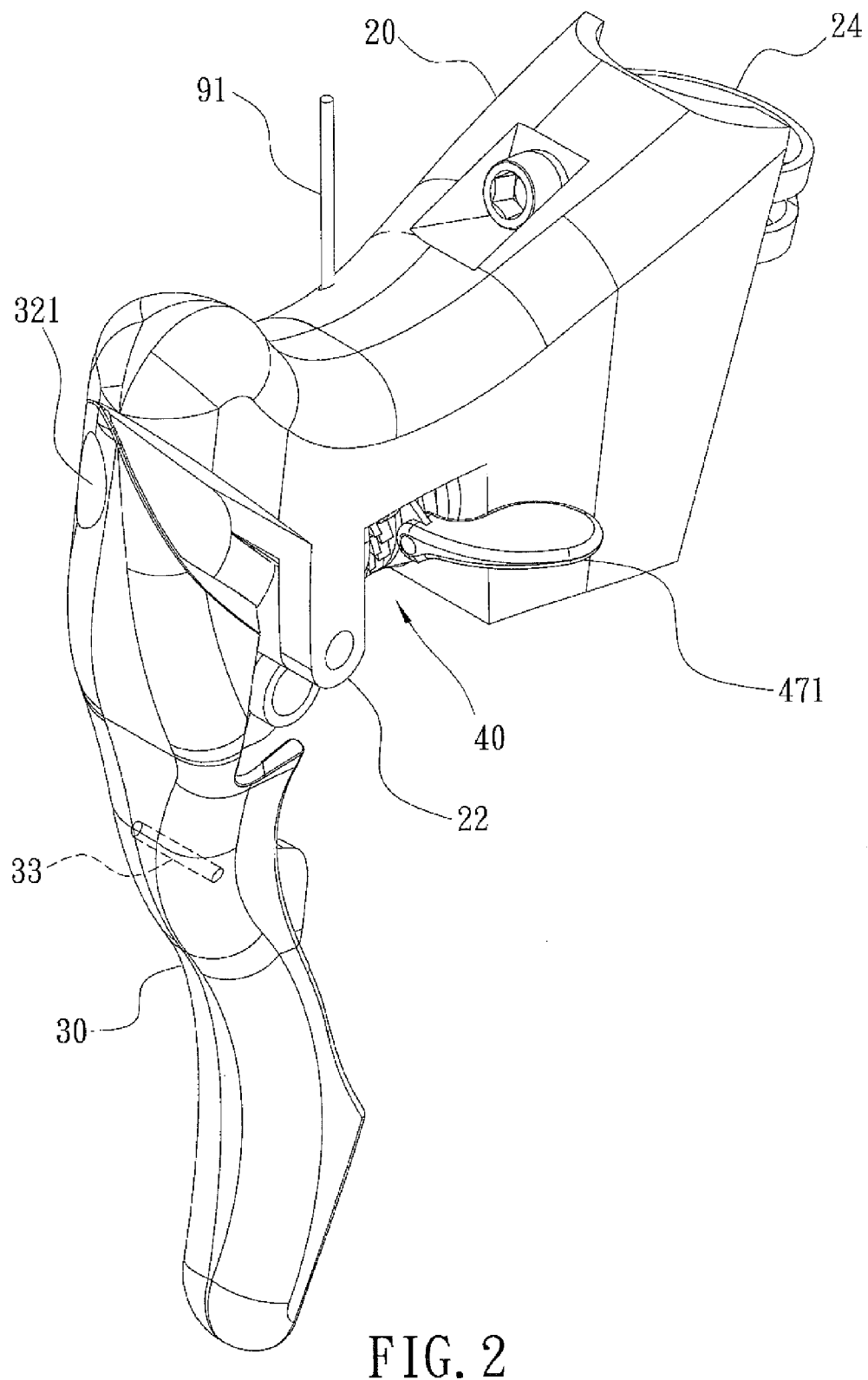
FIG. 2 is a perspective view showing the assembly of the shifter according to the first embodiment of the present invention.
Figure 3:
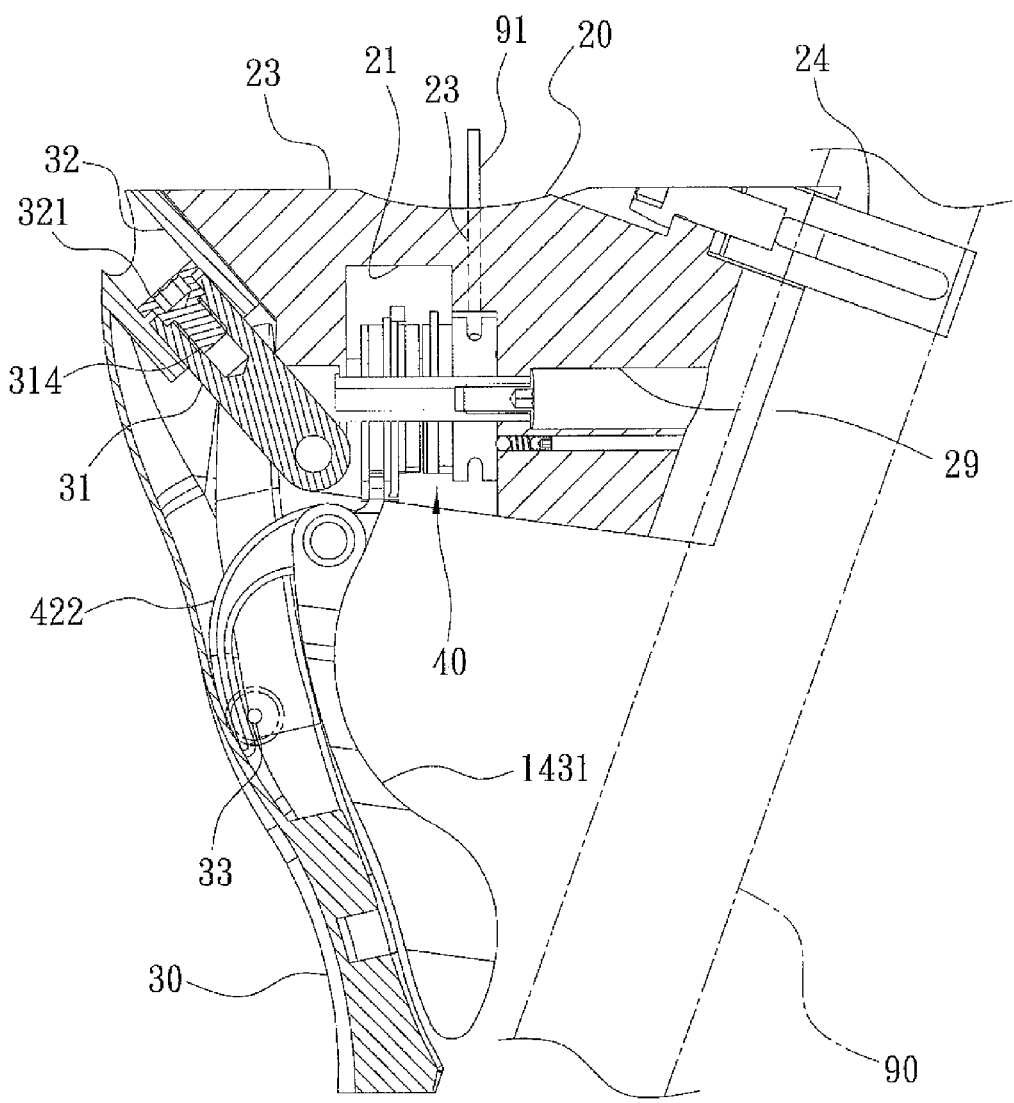
FIG. 3 is a cross sectional view showing the assembly of the shifter according to the first embodiment of the present invention.

The present invention will be clearer from the following description when viewed together with the accompanying drawings, which show, for purpose of illustrations only, the preferred embodiment in accordance with the present invention.

Referring to FIGS. 1-9, a shifter in accordance with a preferred embodiment of the present invention is fixed on a handle 90 of a bicycle and connected with a rear speed changer of a cable 91 and comprises: a body 20, a first bar 30, and a speed changing mechanism 40, the body 20 including the first bar 30 axially coupled with a side thereof, a chamber 21 formed on a bottom end thereof to receive the speed changing mechanism 40, and two tabs 22 disposed on two sides of the bottom end thereof respectively, and each tab 22 including a first hole 221, and the body 20 including a first aperture 23 arranged on a top end thereof and communicating with the chamber 21 to insert the cable 91 into the chamber 21 via the first aperture 23 so as to connect with a first seat 49, the body 20 including a first retaining ring 24 secured on one side thereof to position the body 20 on the handle 90, the chamber 21 including a first positioning pillar 25, an axial shaft 26, a second aperture 27, and a first returning spring 28, all of which are disposed on an inner wall of the chamber 21, the first positioning pillar 25 being provided to fix a first fixing piece 46 in the chamber 21, and the axial shaft 26 being used to axially position a first hook 453 in the chamber 21. The second aperture 27 includes a first ball 271 and a first spring 272, both of which are retained in a first groove 493 of the first seat 49 so that when the first seat 49 rolls or releases the cable 91, a sound is made. The body 20 includes two second holes 29 disposed on two sides thereof individually and communicating with the chamber 21 to insert a first spindle 401 so that the speed changing mechanism 40 is fixed in the chamber 21. Between the two tabs 22 is axially secured a Tee rotary stem 31, and the rotary stem 31 includes a lateral peg 31 disposed on an upper side thereof, and the lateral peg 31 includes two third holes 312 formed on two sides thereof respectively, an extension 313 and a first opening 314, both of which are disposed on a front side of the lateral peg 31, wherein a first screw 222 is inserted into the first hole 221 of the tab 22 and the third hole 312 of the rotary stem 31, and the rotary stem 31 is axially fixed between the tabs 22, the first bar 30 includes a second opening 32 fixed on a top end thereof and a third opening 34 secured on a middle section thereof, a second screw 321 is inserted through the second opening 32 to be locked on the first opening 314 of the extension 313 of the rotary stem 31 so that the first bar 30 is axially coupled with the extension 313 of the rotary stem 31, such that the first bar 30 is moved inward and upward, wherein the first bar 30 includes a first lever 422 arranged therein and a second lever 33 inserted into the third opening 34 to position the first lever 422 so that the first bar 30 is moved inward to brake the bicycle or is moved upward to move the first lever 422, shifting down the bicycle.

The speed changing mechanism 40 is comprised of the first spindle 401, the third screw 403, a first tooth member 41, a first post 421, a first holder 42, the first lever 422, a second holder 43, a third lever 431, an actuating member 429, a second tooth member 44, a third tooth member 45, the first hook 453, the first fixing piece 46, a defining member 47, a fourth lever 471, a fourth tooth member 48, and the first seat 49; the first spindle 401 is inserted through the first tooth member 41, the first holder 42, the second holder 43, the second tooth member 44, the third tooth member 45, the first fixing piece 46, and the first seat 49 to be further locked by the third screw 403, wherein the first tooth member 41 includes an oval first bore 411 disposed on a central portion thereof, the second tooth member 44 includes an oval second bore 441, the third tooth member 45 includes an oval third bore 451 fixed on a central portion thereof, the fourth tooth member 48 includes an oval fourth bore 481 formed on a central position thereof, and the first seat 49 includes an oval fifth bore 491 arranged on a central position thereof, the first spindle 401 includes an oval first column 402, wherein as the first spindle 401 is actuated to rotate by using the fourth lever 471 and the first lever 422, the first tooth member 41, the second tooth member 44, the third tooth member 45, the fourth tooth member 48, and the first seat 49 are rolled or released simultaneously, and then the cable 91 is rolled or released by the first seat 49 to shift upward or downward in a multi-section shifting manner. It is to be noted that the longer the travel is rolled and released, the more the shifting level is changed.

After the speed changing mechanism 40 is connected together, the first positioning pillar 25 is inserted into a fourth opening 461 of the first fixing piece 46 so that the speed changing mechanism 40 is fixed in the chamber 21, wherein the second bore 411 of the first tooth member 41 includes a first ratchet 412 arranged around an outer periphery thereof, the first post 421 includes a fifth opening 423 formed thereon to retain with the first lever 422, and the first post 421 includes a sixth opening 424 disposed on a top end thereof and a first pulling portion 425 fixed on a side thereof, the sixth opening 424 is used to axially position the first post 421 in a seventh opening 428 which is located at a bottom end of the first holder 42, the first holder 42 includes a first orifice 426 fixed on a central position thereof, a second orifice 427 secured on a top end thereof, and a third orifice 428 formed on a bottom end thereof, and the third orifice 428 includes the sixth opening 424, the second orifice 427 is applied to receive the actuating member 429, the actuating member 429 includes a fourth orifice 4291 disposed on a middle section thereof and a stop portion 4292 fixed on a front side thereof, and when the actuating member 429 is not operated, it is pushed by a first projection 433 of the second holder 43, and the second holder 43 includes a fifth orifice 432 formed on a central position thereof, the first projection 433 arranged on a top end thereof, and a sixth orifice 434 secured on a bottom end thereof to insert the third lever 431, the second tooth member 44 includes an oval sixth bore 441 disposed on a central position thereof and having a second ratchet 442 fixed around an outer periphery thereof, the first hook 453 includes a first fastening tail 454 formed on a bottom end thereof, a second and a third posts 455, 456 arranged on two sides thereof individually, and a seventh orifice 457 formed on a top end thereof to retain with the axial shaft 26, wherein the first hook 453 is pressed by the first returning spring 28 to be retained with the third tooth member 45 so that the speed changing mechanism 40 is fixed. The third bore 451 of the third tooth member 45 includes a third ratchet 452 disposed on an outer periphery thereof, and the first fixing piece 46 includes an eighth opening 462 fixed on a central position thereof, a sector slot 463 secured on a peripheral side thereof, and the fourth opening 461 secured on a top end thereof to insert the first positioning pillar 25, the defining member 47 includes a ninth opening 472 secured on a central position thereof, a fan-shaped second projection 473 formed on a side thereof, and a recess 474 arranged on a peripheral side of an upper end thereof, the recess 474 includes a first port 475 secured on a peripheral side thereof to insert the fourth lever 471, and the fourth lever 471 includes a first pushing portion 4711 and a second port 4712, both of which are disposed on a front side of the fourth lever 471, the second port 4712 is screwed with a fourth screw to connect the defining member 47 with the fourth lever 471, the fourth tooth member 48 includes the fourth bore 481 formed on the central position thereof, a fourth ratchet 482 fixed on an outer periphery thereof, the first seat 49 includes the oval fifth bore 491 arranged on the central position thereof, a second groove 492 formed on an outer side thereof to receive the cable 91, and a number of the first grooves 493 arranged on a side surface thereof to match with the first ball 271 and the first spring 272 so that when the first hook 453 is released, the speed changing mechanism 40 rolls to make sound and position.

Figure 7:
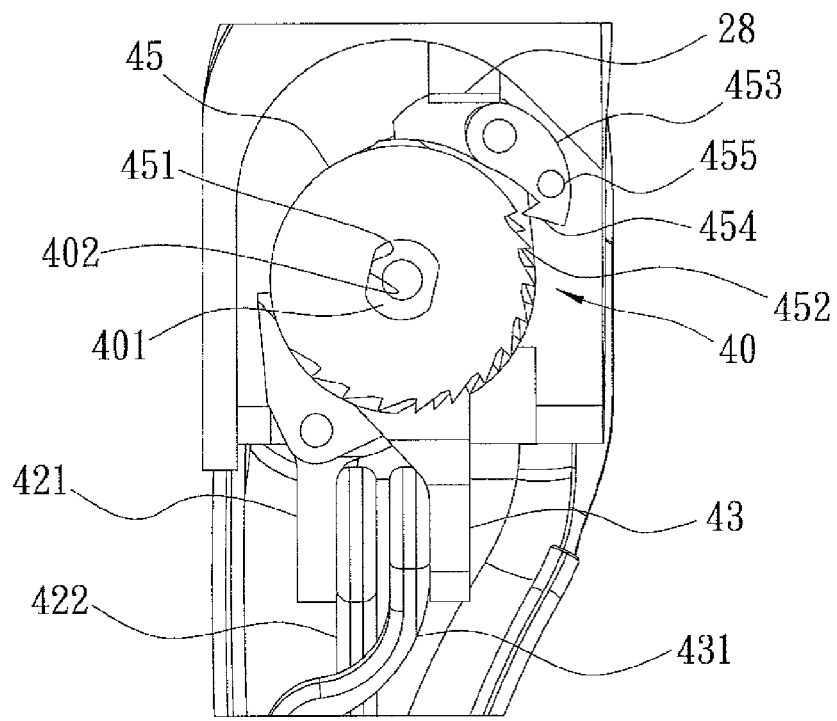
FIG. 7 is a plan view showing the operation of the shifter according to the first embodiment of the present invention.
Figure 8:
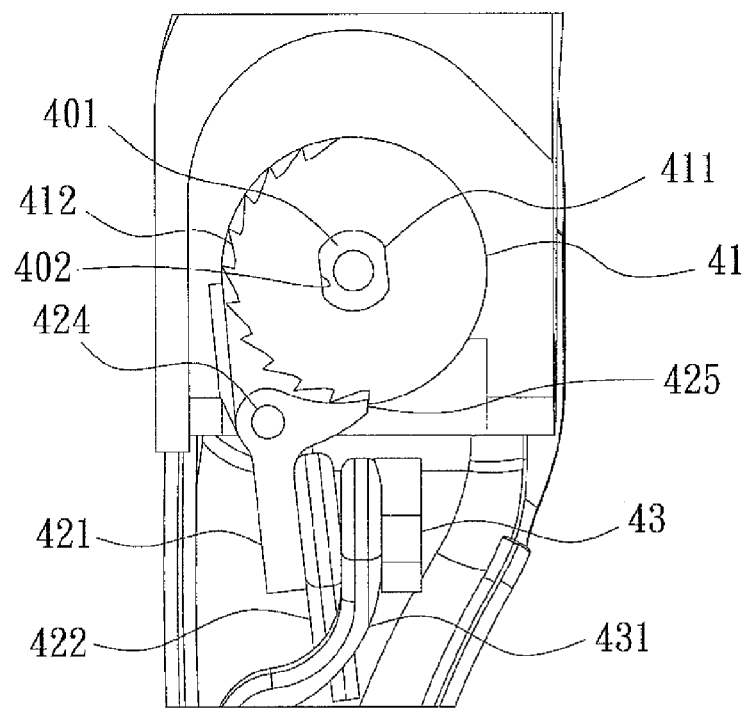
FIG. 8 is another plan view showing the operation of the shifter according to the first embodiment of the present invention.
Figure 9:
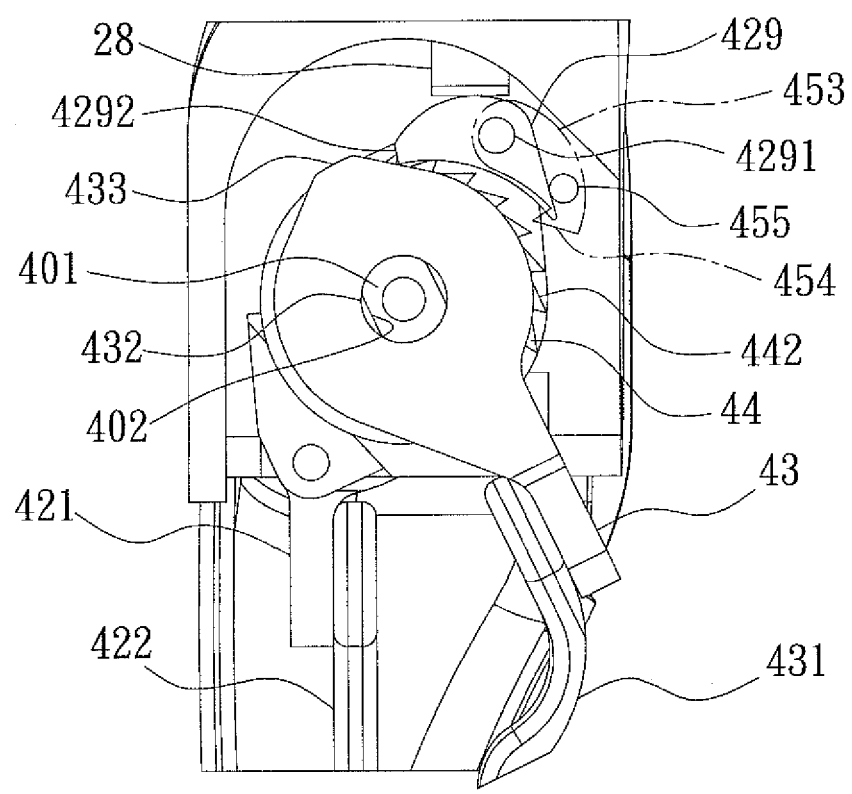
FIG. 9 is another plan view showing the operation of the shifter according to the first embodiment of the present invention.
Figure 10:
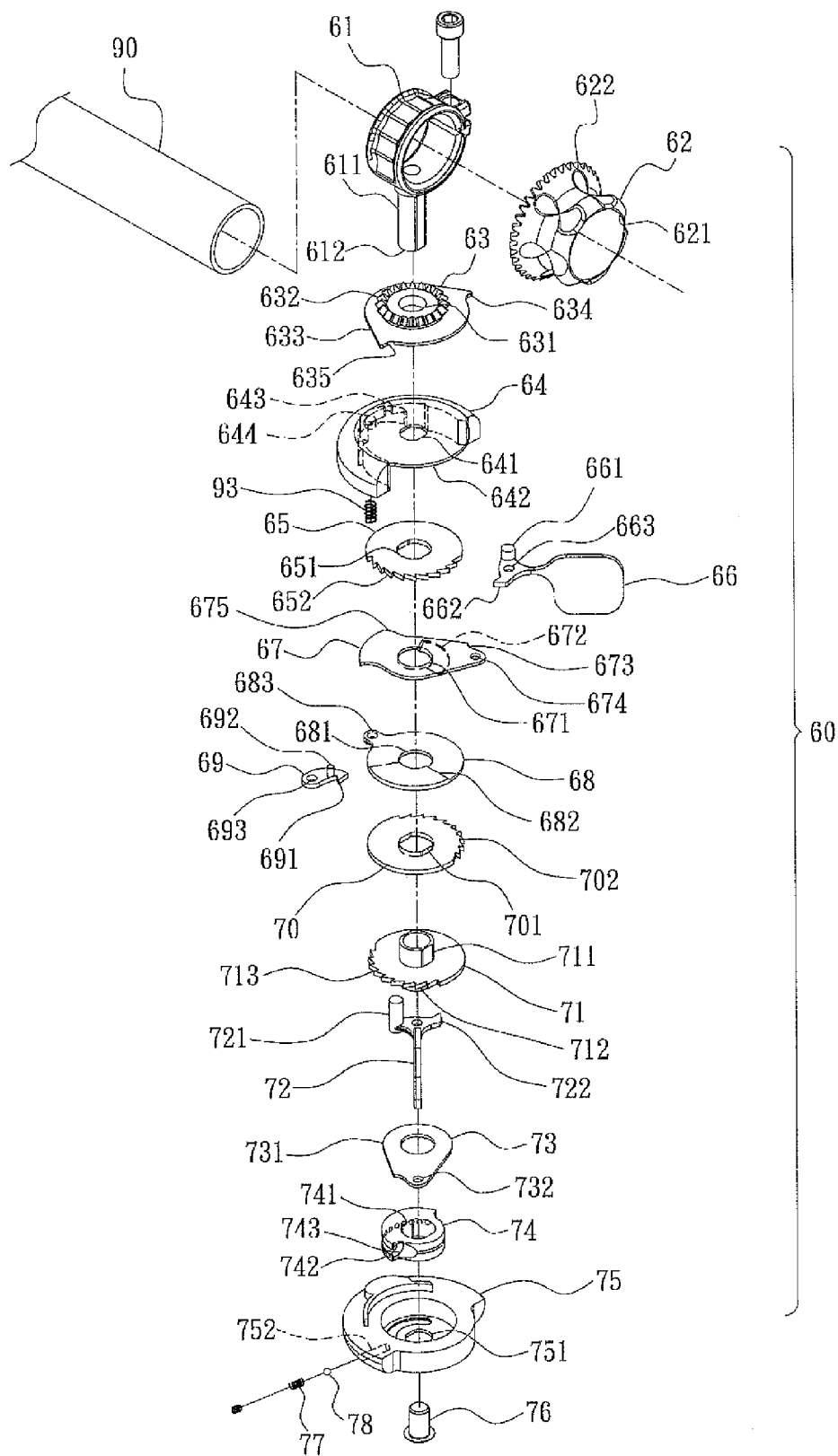
FIG. 10 is a perspective view showing the exploded components of a ratchet speed changing mechanism of a shifter according to a second embodiment of the present invention.
Figure 11:
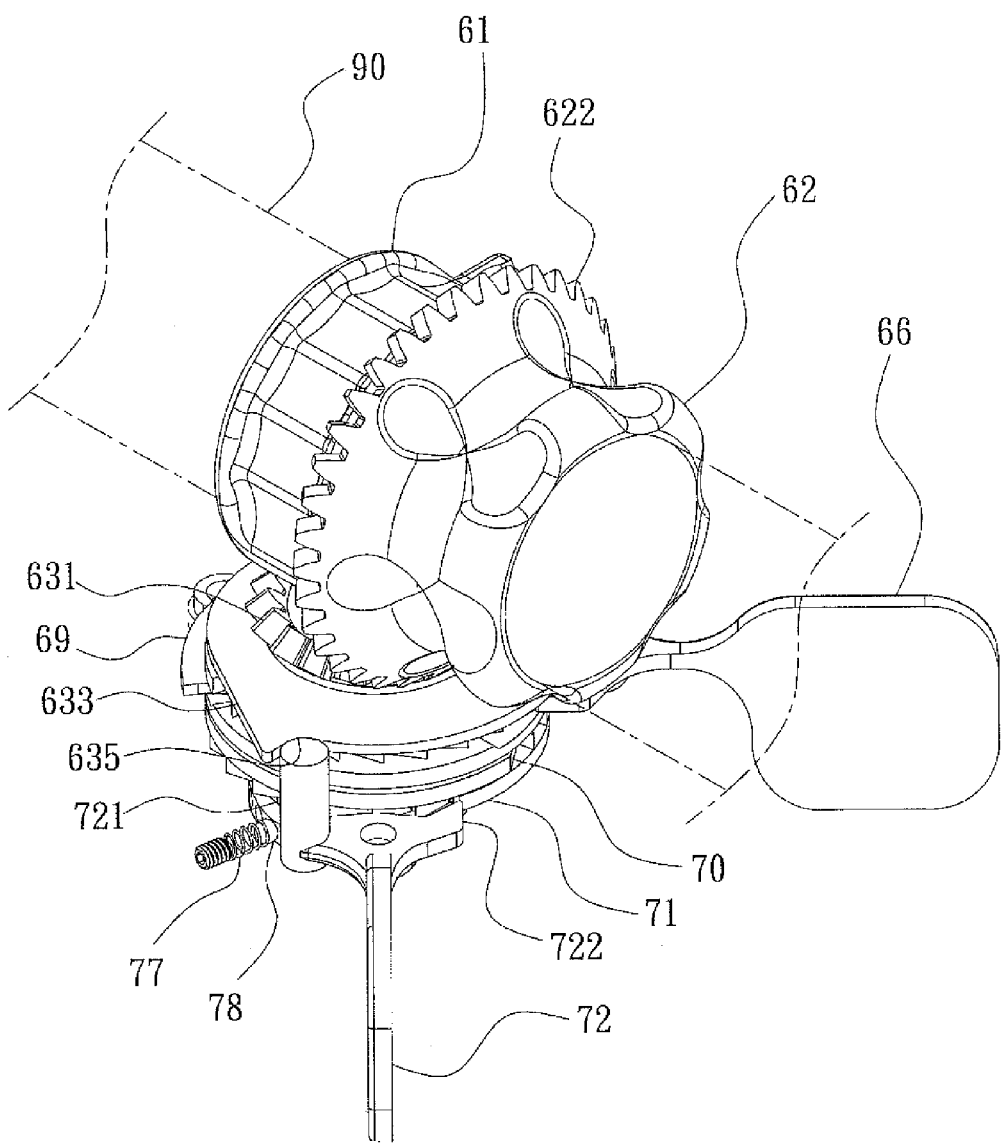
FIG. 11 is a perspective view showing the assembly of the ratchet speed changing mechanism of the shifter according to the second embodiment of the present invention.
Figure 12:
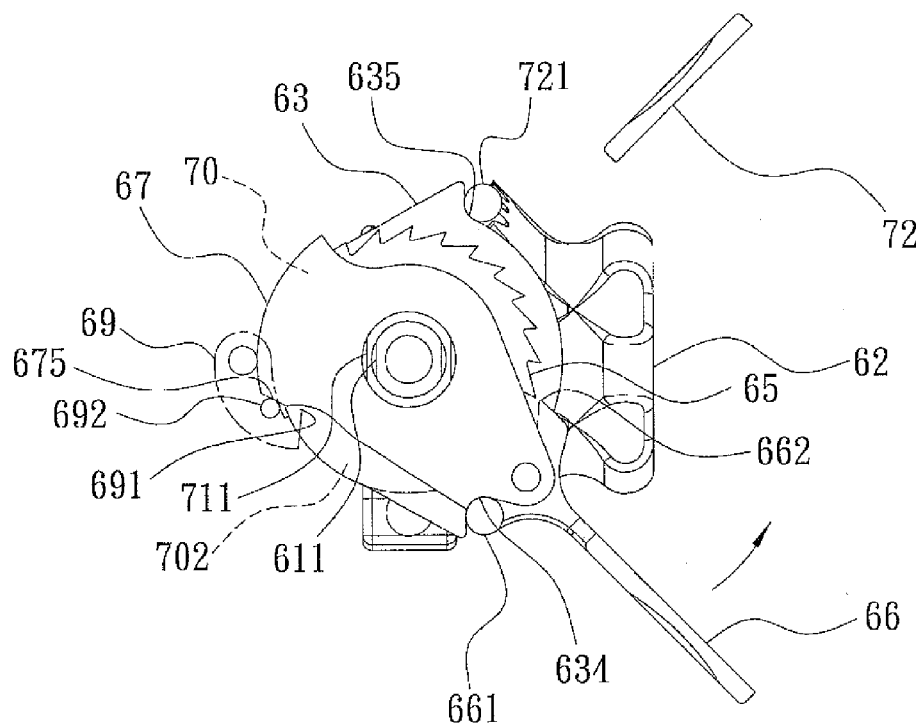
FIG. 12 is a cross sectional view showing the assembly of the ratchet speed changing mechanism of the shifter according to the second embodiment of the present invention.
Figure 13:
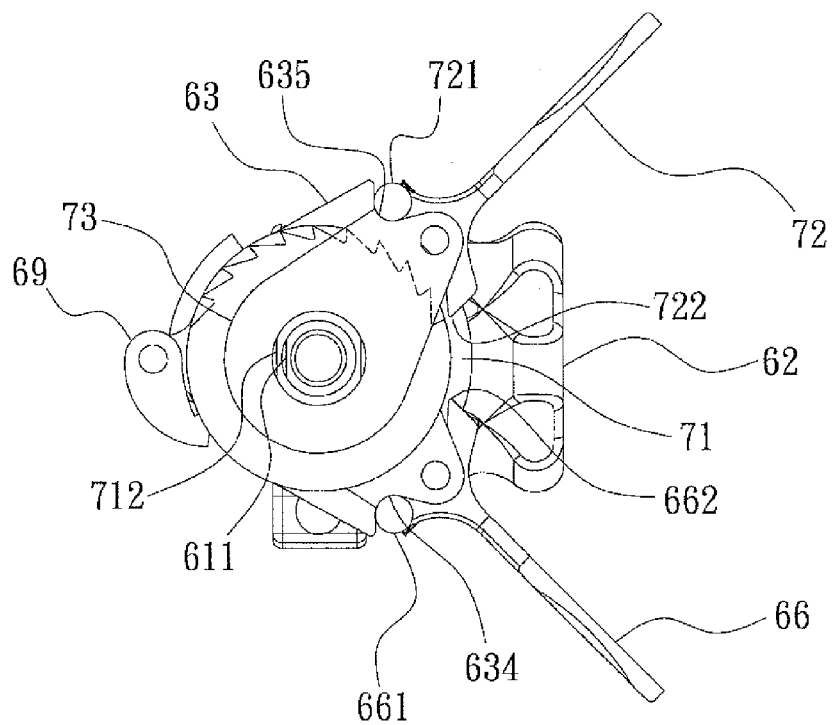
FIG. 13 is another cross sectional view showing the assembly of the ratchet speed changing mechanism of the shifter according to the second embodiment of the present invention.

Referring to FIGS. 2-9, when the speed changing mechanism 40 is not operated, the first fastening tail 454 of the first hook 453 retains with the third ratchet 452 of the third tooth member 45, and the first hook 453 is pressed by the first returning spring 28 to stop the third tooth member 45 rotating in a clockwise direction so that the speed changing mechanism 40 is in a still state. When the fourth lever 471 is actuated, the defining member 47 is rolled so that the recess 474 lifts the third post 456 of the first hook 453 as shown in FIGS. 1 and 7, such that the first hook 453 is rotated, and the first fastening tail 454 disengages from the third ratchet 452 of the third tooth member 45. Referring to FIGS. 1-6, the first pushing portion 4711 of the fourth lever 471 pushes the fourth tooth member 48 to roll in a clockwise direction so that the first tooth member 41, the second tooth member 44, the third tooth member 45, the fourth tooth member 48, the first bore 411, the second bore 441, the third bore 451, the fourth bore 481, and the fifth bore 491 of the first seat 49 are rolled in the clockwise direction with the first column 402 of the first spindle 401, and the first seat 49 rolls in the clockwise direction as well to pull the cable 91 to move toward the rear speed changer so that the rear speed changer moves to accelerate speed among a first, a second, and a third levels. When the fourth lever 471 returns back to an original position, the defining member 47 is rolled to disengage from the second projection 473 so as to be further retained in the sector slot 463, such that the defining member 47 stops rolling so that the first hook 453 is pressed by the first returning spring 28, and the first fastening tail 454 hooks the third ratchet 452 of the third tooth member 45 to return back to the original position, hence the third tooth member 45 can not roll so that the speed changing mechanism 40 returns the still state.

When the first bar 30 is moved upward, the first lever 422 is actuated so that the first post 421 rotates along the sixth opening 424, and the first pulling portion 425 of the first post 421 pulls the first tooth member 41 to roll in an anti-clockwise direction, thereafter the second tooth member 44, the third tooth member 45, the fourth tooth member 48, and the first seat 49 are actuated to roll in the anti-clockwise direction with the first column 402 of the first spindle 401 so that the cable 91 is pulled toward the rear speed changer, then the rear speed changer decelerates speed among the first, the second and the third levels. When the third tooth member 45 stops rolling, the first fastening tail 454 of the first hook 453 engages with the third ratchet 452 along the third ratchet 452 of the third tooth member 45, and when the first lever 422 moves back to the original position, the first fastening tail 454 of the first hook 453 hooks the third ratchet 452 of the third tooth member 45 again so that the third tooth member 45 can not rotate, hence the speed changing mechanism 40 returns the still state.

Figure 4:
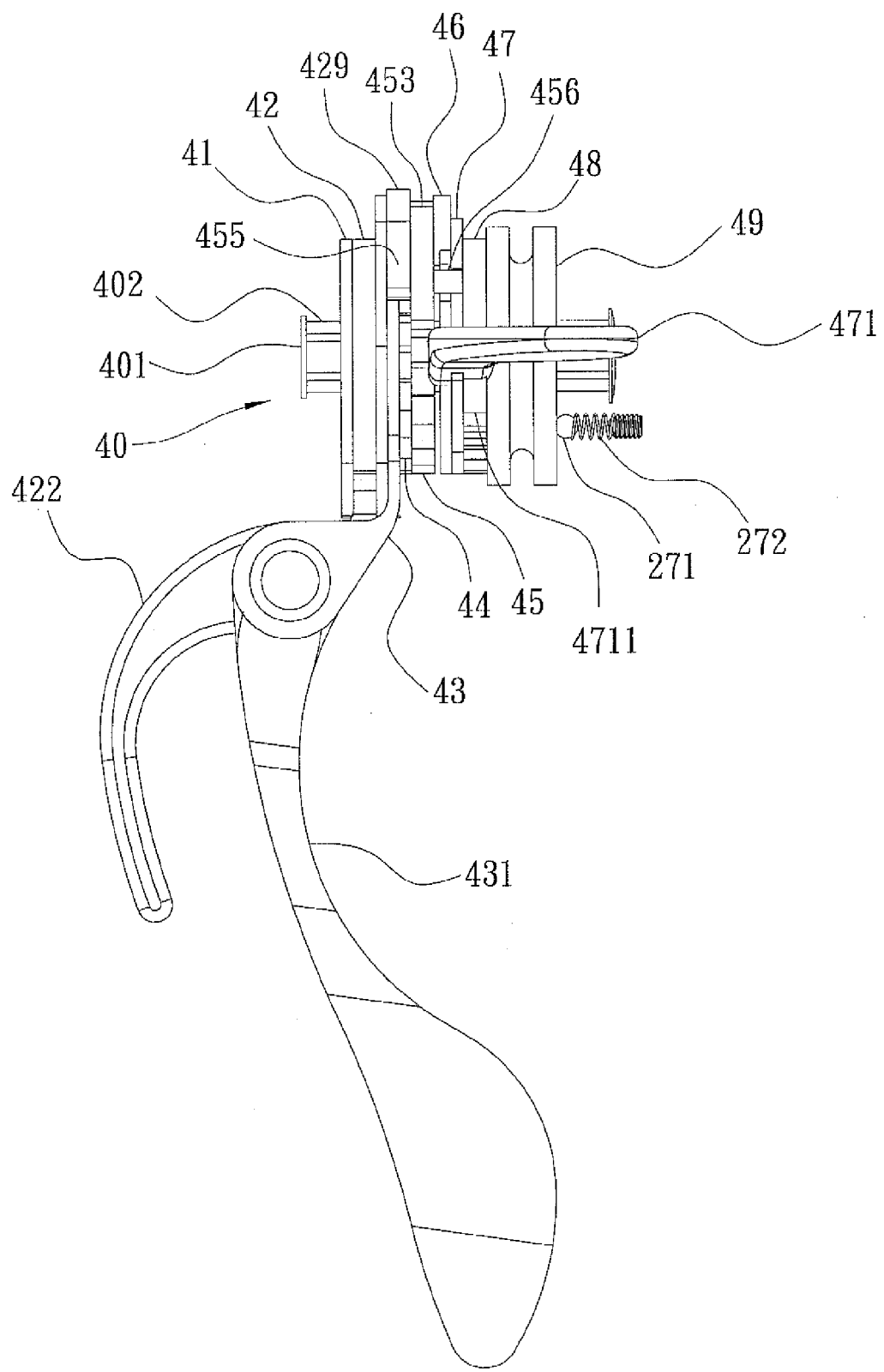
FIG. 4 is a plan view showing the assembly of a speed changing mechanism of the shifter according to the first embodiment of the present invention.
Figure 5:
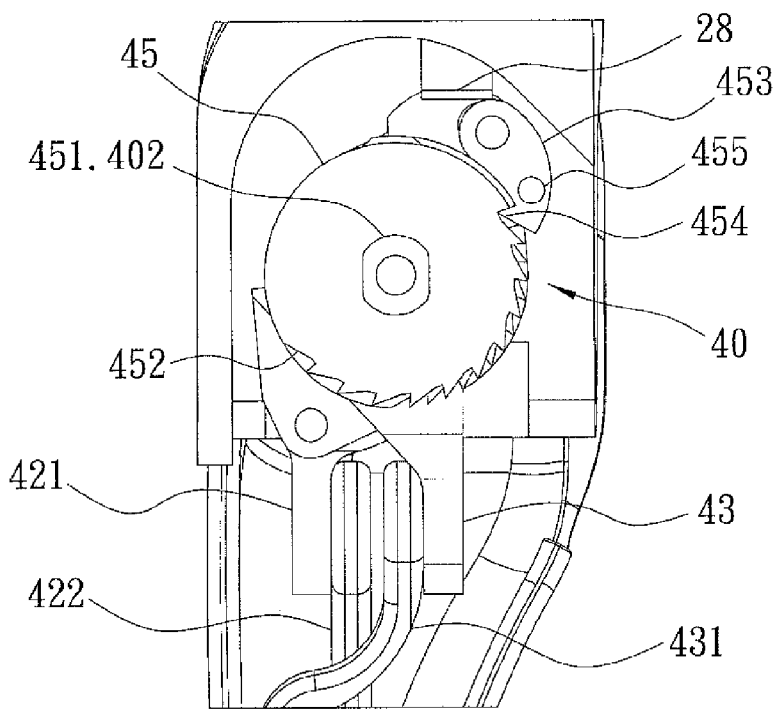
FIG. 5 is a front plan view showing the assembly of the shifter according to the first embodiment of the present invention.
Figure 6:
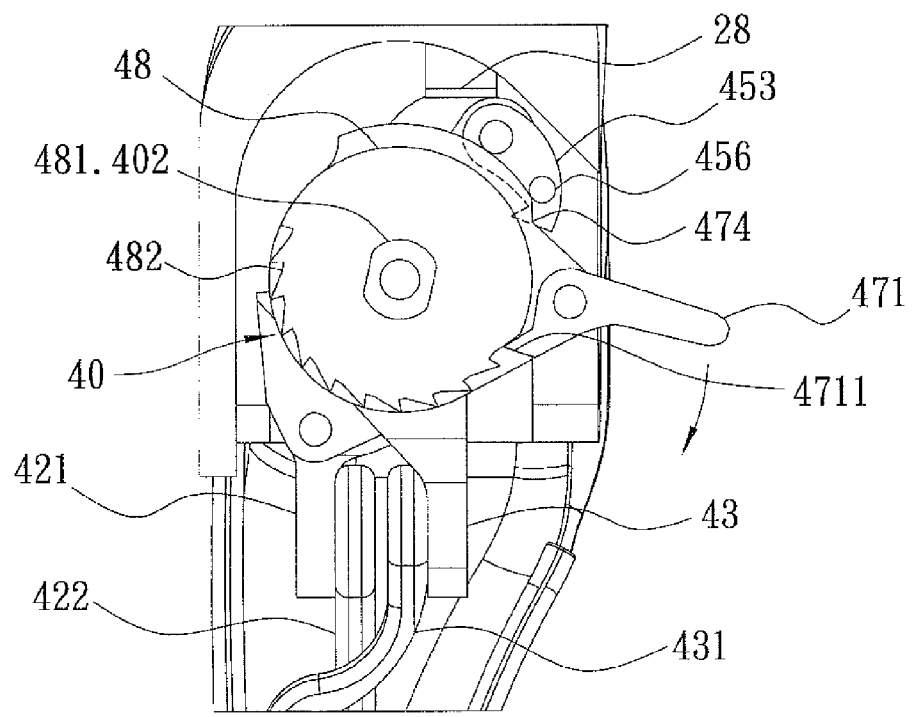
FIG. 6 is a plan view showing the non-operation of the shifter according to the first embodiment of the present invention.

When the third lever 431 is moved, the second holder 43 rotates along the first spindle 401 in the anti-clockwise direction so that the actuating member 429 is pressed by the first returning spring 28 to rotate along the fourth orifice 4291, such that the second posts 455 is lifted to further lift the first hook 453 as illustrated in FIGS. 1, 4, and 7 so that the first fastening tail 454 of the first hook 453 releases the third ratchet 452 of the third tooth member 45, and then the actuating member 429 is pressed by the first returning spring 28, the stop portion 4292 of the actuating member 429 retains with the first lever 442 of the second tooth member 44 so that as the second tooth member 44 rolls, only one first lever 422 is released, thereby the first column 402 of the first spindle 401 rolls in a smaller distance, and the cable 91 is pulled by the first seat 49 to couple with the rear speed changer so that the rear speed changer displaces to actuate the first lever 422 to move backward in only one level.

With reference to FIGS. 10-13, a ratchet speed changing mechanism 60 of a shifter according to another embodiment of the present invention is comprised of a second retaining ring 61, a rotary grip 62, a first bevel gear 63, a first housing 64, a fifth tooth member 65, a fifth lever 66, a second fixing piece 67, a limiting member 68, a second hook 69, a sixth tooth member 70, a seventh tooth member 71, a sixth lever 72, a third holder 73, a second seat 74, and a second housing 75. The second retaining ring 61 includes a second spindle 611 inserted through the first bevel gear 63, the first housing 64, the fifth tooth member 65, the second fixing piece 67, the limiting member 68, the sixth tooth member 70, the seventh tooth member 71, the third holder 73, the second seat 74, and the second housing 75 to lock with a fifth screw 76, wherein the first housing 64 and the second housing 75 includes an oval seventh bore 641 and an oval eighth bore 751 disposed on central positions thereof respectively to position the first housing 64 and the second housing 75 by matching with an oval second column 612 of the second spindle 611, and the fifth tooth member 65 and the sixth tooth member 70 includes an oval ninth bore and an oval tenth bore fixed on central positions thereof individually to fit with an oval fourth post 711 of the seventh tooth member 71, the second seat 74 includes an oval eleventh bore 741 secured on a central position thereof to fit with an oval fourth post 712 of the seventh tooth member 71 so as to rotate the rotary grip or so that when the fifth lever is moved, the fifth tooth member 65, the sixth tooth member 70, the seventh tooth member 71, and the second seat 74 roll simultaneously, and the second seat 74 includes the cable 91 connected with the rear speed changer so that when the second seat 74 is rolled or the cable 91 is released, the shifting level is moved to accelerate or decelerate speed of the bicycle, wherein the rolling distance and the releasing travel are directly proportional to the shifting level.

The rotary grip 62 includes a tenth opening 621 formed on a central position thereof and a second bevel gear 622 arranged on a front side thereof to insert the handle 90 so that the second bevel gear 622 engages with teeth 632 of the first bevel gear 63, and the second retaining ring 61 is locked on the handle 90. The second retaining ring 61 includes the second spindle 611 inserted through the first bevel gear 63, the first housing 64, the fifth tooth member 65, the second fixing piece 67, the limiting member 68, the sixth tooth member 70, the seventh tooth member 71, the third holder 73, the second seat 74, and the second housing 75 so as to lock with the fifth screw 76. The first bevel gear 63 includes a fourth hole 631 and the teeth 632 disposed on a central position thereof, and the teeth 632 includes a thrust panel 633 disposed on a bottom end thereof, the thrust panel 633 includes two first notches 634, 635 fixed on two sides thereof respectively to push a first actuated shank 611 and a second actuated shank 721 of the fifth lever 66 and the sixth lever 72 respectively, and the first housing 64 includes the oval seventh bore 641 disposed on the central position thereof and a cavity 642 secured on a bottom end thereof to receive the fifth lever 66, the fifth tooth member 65, the second fixing piece 67, the limiting member 68, the second hook 69, the sixth tooth member 70, the seventh tooth member 71, the third holder 73, the sixth lever 72, and the second seat 74. The cavity 642 includes a fifth hole 643 and a second positioning pillar 25 arranged on a top end thereof, wherein the fifth hole 643 is used to lock the limiting member 68, and the second hook 69 includes a second returning spring 93 disposed on a peripheral side thereof, the fifth tooth member 65 includes an oval twelfth bore 651 fixed on a central position thereof and a fifth ratchet 652 secured on an outer side thereof. The second fixing piece 67 includes an eighth orifice 671 formed on a central position thereof, a fan-shaped third projection 672 arranged on a bottom end thereof, and a dent 673 disposed on an upper end thereof, and the dent 673 includes a first mouth 674 retained with the fifth lever 66 and an abutting block 675, the fifth lever 66 includes a second pushing portion 662 disposed on a front side thereof, a third actuated shank 661 fixed on another side thereof, and a second mouth 663 secured on a central position thereof. The limiting member 68 includes a third mouth 681 attached on a central position thereof, a fan-shaped fourth projection 682 formed on a peripheral side thereof, and an intake 683 arranged on an outer side thereof to lock the limiting member 68 in the cavity 642. The second hook 69 includes a second fastening tail 691 disposed on a front side thereof, a fifth post 692 fixed on a peripheral side of the second fastening tail 691 and retained in the dent 673, and a fourth mouth 693 secured on a top end thereof to axially position the second hook 69 on a second bar 644 of the cavity 642 of the first housing 64, and while the second fastening tail 691 of the second hook 69 is pressed by the second returning spring 93, the ratchet speed changing mechanism 60 is not rolled but be fixed, the sixth tooth member 70 includes an oval thirteenth bore 701 disposed on a central position thereof and a sixth ratchet 702 fixed on an outer side thereof, the seventh tooth member 71 includes the oval fourth post 711 extending from a central position of a top end thereof, the oval fourth post 712 formed on a central position of a bottom end thereof, a seventh ratchet 713 secured on an outer side thereof, and the oval fourth post 711 is inserted through the fifth tooth member 65, the second fixing piece 67, the limiting member 68, and the sixth tooth member 70, the fourth post 712 is inserted through the third holder 73 and the second seat 74. The sixth lever 72 includes a second pulling portion 722 disposed on a front side thereof, the second actuated shank 721 fixed on another side thereof, an eleventh opening 723 secured on a middle section thereof. The third holder 73 includes a ninth orifice 731 formed on a central position thereof and a tenth orifice 732 arranged on an outer side thereof to position the sixth lever 72. The second seat 74 includes an oval fourteenth bore 741 disposed on a central position thereof, a second notch 742 fixed on an outer side thereof to receive the cable 91, and a plurality of third grooves 743 secured on a peripheral side thereof to cooperate with a second ball 78 and a second spring 77 of a third aperture 752, such that when the second hook 69 is released from the positioning, the ratchet speed changing mechanism 60 makes sounds during rolling. The second housing 75 includes an oval fifteenth bore 751 disposed on a central position thereof and the third aperture 752 and a third returning spring 753, both of which are secured on a peripheral side of the second housing 75, wherein the third aperture 752 is used to receive the second ball 78 and the second spring 77 so that the second ball 78 and the second spring 77 contact with the third groove 743 of the second seat 74.

When the rotary grip 62 is rotated in the clockwise direction, the first bevel gear 63 rotates along the second spindle 611, and the first notch 634 actuates the third actuated shank 661 of the fifth lever 66. On the contrary, when the fifth lever 66 is actuated, the rotary grip 62 is not rotated so that the abutting block 675 of the second fixing piece 67 pushes the fifth post 692 of the second hook 69, and then the second fastening tail 691 disengages from the sixth ratchet 702 of the sixth tooth member 70, thus releasing the positioning. In addition, the third actuated shank 661 of the fifth lever 66 is actuated to rotate in the clockwise direction so that the second pushing portion 662 of the fifth lever 66 pushes the fifth tooth member 65 to rotate in the clockwise direction. Thereafter, the sixth tooth member 70, the seventh tooth member 71, and the second seat 74 roll simultaneously, and then the cable 91 is pulled to connect with the rear speed changer so that the rear speed changer displaces to accelerate speed among a first, a second, and a third levels. When the fifth lever 66 returns an original position, the second fixing piece 67 disengages from the fan-shaped fourth projection 682 of the limiting member 68, and the fan-shaped third projection 672 of the second fixing piece 67 engages with the fan-shaped fourth projection 682 of the limiting member 68 so that the second fixing piece 67 stops rolling, hence the second hook 69 is pressed by the second returning spring 93 so that the second fastening tail 691 hooks the sixth ratchet 702 of the sixth tooth member 70, hence the sixth tooth member 70 will not rotate so that the ratchet speed changing mechanism 60 returns a still state.

When the rotary grip 62 is rotated in the anti-clockwise direction, the first bevel gear 63 rotates along the second spindle 611 in the anti-clockwise direction, and then the first notches 634 actuates the second actuated shank 721 of the sixth lever 72. On the contrary, when the sixth lever 72 is actuated, the rotary grip 62 does not rotate, and when the sixth lever 72 is moved, the second actuated shank 721 of the sixth lever 72 rotates in the anti-clockwise direction so that the second pulling portion 722 of the sixth lever 72 pulls the seventh tooth member 71 to rotate in the anticlockwise direction.

Thereafter, the sixth tooth member 70, the fifth tooth member 65, and the second seat 74 roll in the anti-clockwise direction to pull the cable 91 so that the cable 91 couples with the rear speed changer, such that the rear speed changer displaces to decelerate speed among the first, the second, and the third levels. When the handle 90 stops rolling in the anti-clockwise direction, the second fastening tail 691 of the second hook 69 engages with the sixth ratchet 702 of the sixth tooth member 70, wherein when the sixth lever 72 returns the original position, the second fastening tail 691 of the second hook 69 hooks the sixth ratchet 702 of the sixth tooth member 70 so that the sixth tooth member 70 can not be rotated, thereby the ratchet speed changing mechanism 60 returns a still state.

While we have shown and described various embodiments in accordance with the present invention, it is clear to those skilled in the art that further embodiments may be made without departing from the scope of the present invention.

What is claimed is:

1. A shifter being fixed on a handle of a bicycle and connected with a rear speed changer of a cable and comprising:
a body, a first bar, and a speed changing mechanism, the body including the first bar axially coupled with a side thereof, a chamber formed on a bottom end thereof to receive the speed changing mechanism, and two tabs disposed on two sides of the bottom end thereof respectively, and each tab including a first hole, and the body including a first aperture arranged on a top end thereof and communicating with the chamber to insert the cable into the chamber via the first aperture so as to connect with a first seat, the body including a first retaining ring secured on one side thereof to position the body on the handle, the chamber including a first positioning pillar, an axial shaft, a second aperture, and a first returning spring, all of which are disposed on an inner wall of the chamber, the first positioning pillar being provided to fix a first fixing piece in the chamber, and the axial shaft being used to axially position a first hook in the chamber; wherein
the second aperture includes a first ball and a first spring, both of which are retained in a first groove of the first seat so that when the first seat rolls or releases the cable, a sound is made, the body includes two second holes disposed on two sides thereof individually and communicating with the chamber to insert a first spindle so that the speed changing mechanism is fixed in the chamber; between the two tabs is axially secured a Tee rotary stem, and the rotary stem includes a lateral peg disposed on an upper side thereof, and the lateral peg includes two third holes formed on two sides thereof respectively, an extension and a first opening, both of which are disposed on a front side of the lateral peg, wherein a first screw is inserted into the first hole of the tab and the third hole of the rotary stem, and the rotary stem is axially fixed between the tabs, the first bar includes a second opening fixed on a top end thereof and a third opening secured on a middle section thereof, a second screw is inserted through the second opening to be locked on the first opening of the extension of the rotary stem so that the first bar is axially coupled with the extension of the rotary stem, such that the first bar is moved inward and upward, wherein the first bar includes a first lever arranged therein and a second lever inserted into the third opening to position the first lever so that the first bar is moved inward to brake the bicycle or is moved upward to move the first lever, shifting down the bicycle.

2. The shifter as claimed in claim 1, wherein the speed changing mechanism is comprised of the first spindle, the third screw, a first tooth member, a first post, a first holder, the first lever, a second holder, a third lever, an actuating member, a second tooth member, a third tooth member, the first hook, the first fixing piece, a defining member, a fourth lever, a fourth tooth member, and the first seat.

3. The shifter as claimed in claim 1, wherein the first tooth member includes an oval first bore disposed on a central portion thereof, the second tooth member includes an oval second bore, the third tooth member includes an oval third bore fixed on a central portion thereof, the fourth tooth member includes an oval fourth bore formed on a central position thereof, and the first seat includes an oval fifth bore arranged on a central position thereof, the first spindle includes an oval first column, wherein as the first spindle is actuated to rotate by using the fourth lever and the first lever, the first tooth member, the second tooth member, the third tooth member, the fourth tooth member, and the first seat are rolled or released simultaneously, and then the cable is rolled or released by the first seat to shift upward or downward in a multi-section shifting manner.

4. The shifter as claimed in claim 1, wherein the first hook is pressed by the first returning spring to be retained with the third tooth member so that the speed changing mechanism is fixed.

5. The shifter as claimed in claim 1, wherein when the fourth lever is actuated, the defining member is rolled so that the recess lifts the third post of the first hook, such that the first hook is rotated, and the first fastening tail disengages from the third ratchet of the third tooth member; the first pushing portion of the fourth lever pushes the fourth tooth member to roll in a clockwise direction so that the first tooth member, the second tooth member, the third tooth member, the fourth tooth member, the first bore, the second bore, the third bore, the fourth bore, and the fifth bore of the first seat are rolled in the clockwise direction with the first column of the first spindle, and the first seat rolls in the clockwise direction as well to pull the cable to move toward the rear speed changer so that the rear speed changer moves to accelerate speed among a first, a second, and a third levels.

6. The shifter as claimed in claim 1, wherein when the third lever is moved, the second holder rotates along the first spindle in the anti-clockwise direction so that the actuating member is pressed by the first returning spring to rotate along the fourth orifice, such that the second posts is lifted to further lift the first hook so that the first fastening tail of the first hook releases the third ratchet of the third tooth member, and then the actuating member is pressed by the first returning spring, the stop portion of the actuating member retains with the first lever of the second tooth member so that as the second tooth member rolls, only one first lever is released, thereby the first column of the first spindle rolls in a smaller distance, and the cable is pulled by the first seat to couple with the rear speed changer so that the rear speed changer displaces to actuate the first lever to move backward in only one level.

7. The shifter as claimed in claim 1, wherein the first fixing piece includes a sector slot of the first groove so that when the first positioning pillar is released, the speed changing mechanism rolls to make sound.

8. The shifter as claimed in claim 1, wherein when the third lever is moved, the second holder rotates along the first spindle in the anti-clockwise direction so that the actuating member is pressed by the first returning spring to rotate along the fourth orifice, such that the second posts is lifted to further lift the first hook so that the first fastening tail of the first hook releases the third ratchet of the third tooth member, and then the actuating member is pressed by the first returning spring, the stop portion of the actuating member retains with the first lever of the second tooth member so that as the second tooth member rolls, only one first lever is released, thereby the first column of the first spindle rolls in a smaller distance, and the cable is pulled by the first seat to couple with the rear speed changer so that the rear speed changer displaces to actuate the first lever to move backward in only one level.

* * * * *